United States Patent
Hilbrich

Patent Number: 6,016,740
Date of Patent: *Jan. 25, 2000

[54] FILTERING DEVICE FOR AN ESPRESSO-TYPE COFFEE MAKER

[76] Inventor: Daniel A. Hilbrich, 125 Lake Village Dr., Apt. #307, Ann Arbor, Mich. 48103

[*] Notice: This patent issued on a continued prosecution application filed under 37 CFR 1.53(d), and is subject to the twenty year patent term provisions of 35 U.S.C. 154(a)(2).

[21] Appl. No.: 08/977,997

[22] Filed: Nov. 25, 1997

[51] Int. Cl.[7] .............................. A47J 31/00; A23F 5/26
[52] U.S. Cl. ................ 99/298; 99/307; 99/323; 426/433
[58] Field of Search ............................ 99/279, 295, 298, 99/304, 307, 302 R, 323; 426/433, 77, 84; 210/488, 489, 496

[56] References Cited

U.S. PATENT DOCUMENTS

| | | | |
|---|---|---|---|
| 2,416,524 | 2/1947 | Huse et al. | 210/489 |
| 2,770,181 | 11/1956 | Kahan | 210/489 X |
| 3,266,411 | 8/1966 | Oakley | 210/489 |
| 3,361,052 | 1/1968 | Weber | 99/302 R |
| 3,405,630 | 10/1968 | Weber, III | 99/298 X |
| 3,811,373 | 5/1974 | Telco . | |
| 4,052,318 | 10/1977 | Krebs | 210/489 X |
| 4,882,982 | 11/1989 | Muttoni . | |
| 5,150,645 | 9/1992 | Schiettecatte . | |
| 5,280,747 | 1/1994 | Bonneville et al. . | |
| 5,392,694 | 2/1995 | Muller et al. . | |
| 5,403,605 | 4/1995 | Smith et al. | 426/433 |
| 5,447,631 | 9/1995 | Mahlich . | |

OTHER PUBLICATIONS

R. Urgert, A.G.M. Schultz & M.B. Katan, *Effects of Cafestol and Kahweol from Coffee Ground Son Serm Lipids and Serum Liver Enzymes in Humans,* American Journal of Clinical Nutrition (AM. J. Clin. Nutr.) 1995;61 pp. 149 to 154.

M. Van Desseldorp, et al., *Cholesterol—Raising Factor From Boiled Coffee Does not Pass a Paper Filter,* Arteriosclerosis and Thrombosis, vol. 11, No. 3, May/Jun. 1991, pp. 586 to 593.

*Ulmann's Encyclopedia of Industrial Chemistry*—5th Edition, 1986; vol. A7: Chlorophenols to Copper Compounds p. 315, pp. 323 to 328, p. 330, pp. 333 and 334, and pp. 336–339.

H. Heckers, U. Gobel & U. Kleppel, *End of the Coffee Mystery: Diterpene Alcohols Raise Serum Low–Density Lipoprotein Cholesterol and Triglyceride Levels,* Journal of Internal Medicine, (J. Int. Med.), vol. 235, 1994; pp. 192 and 193.

J. Raloff, *Coffee: Brewing's Link to Cholesterol,* Science News magazine, vol. 148, Sep. 16, 1995, edition, p. 182.

*Filtered Coffee Friendlier to the Heart,* Science News magazine, vol. 147, Feb. 4, 1995 edition, p. 72.

(List continued on next page.)

Primary Examiner—Reginald L. Alexander
Attorney, Agent, or Firm—Richard G. Kinney

[57] ABSTRACT

A filtering device for an espresso-type coffee maker of the type having a spout to deliver heated water under pressure, and a receptacle to receive brewed filtered coffee having a metallic filter in the path of heated coffee passing to the receptacle, and at least one layer of a paper filter in the path of the heated coffee passing to the receptacle that captures lipids and grounds from the brewed coffee.

7 Claims, 1 Drawing Sheet

OTHER PUBLICATIONS

Kirk–Othmer, *Encyclopedia of Chemical Technology,* Fourth Edition, vol. 4, Chlorocarbons and Chlorohydrocarbons—$C_2$ to Combustion Technology, published by John Wiley & Sons, pp. 795 to 799, p. 801, and pp. 809 to 811.

P. Zock, M.B. Katan, M.P. Merkus, et al., *Effect of a Lipid–Rich Fraction from Boiled Coffee on Serum Cholesterol* Lancet 1990; 335–1235–7.

W. Weusten–Van Der Woy, et al., *Identity to the Cholesterol Raising Factor From Boiled Coffee and its Effects on Liver Function Enzymes,* Journal of Lipid Research (J. Lipid Res.) 1994; 35:721–33.

E. Arnesen, N.E. Huseby, T. Brenn & K. Try, *The Tromso Heart Study; Distribution of, and Determinants for, Gamma–Glutamyl Transferase in a Free Living Population,* Scandinavian Journal of Clinical Laboratory Investigation, (Scand. J. Clin. Lab. Invest.) 1986; 46:63–70.

O. Nelssen, D.H. Forde & T. Brenn, *The Tromso Study, Distribution and Population Determinates of Gamma–Glutamyl Transferase,* American Journal of Epidemiology (AM. J. Epidemiol.) 1990; 132:318–26.

FILTERING DEVICE FOR AN ESPRESSO-TYPE COFFEE MAKER

FIELD OF THE INVENTION

The present invention relates to filtering devices for an espresso-type coffee maker.

BACKGROUND OF THE INVENTION

Espresso-type coffee makers are well known. Typically, the espresso-type coffee makers deliver hot water having an optimum temperature of approximately 96 degrees Centigrade through very finely ground coffee in a metallic filter pan using a driving pressure of 3 to 15 bar. Examples of espresso-type coffee makers are described and depicted in U.S. Pat. Nos. 5,280,747; 5,392,694; 4,882,982; and 5,150,645. Current technology in espresso filtration provides for a finely fenestrated metallic filter on top of which are situated coffee grounds, 0.3 millimeters in size or less (particle size). This metallic filter functions to intercept most of the coffee grounds while allowing the liquid coffee beverage along with its oils and some fine particulate grounds to pass into the awaiting cup. Although such filtration of particulate matter (grounds), until presently, has been considered "state of the art" world-wide, recent proof that the lipid fraction (coffee oils) as well as the fine particulate coffee grounds which escape filtration in this previously described system, are indeed harmful to the human organism, has come to light. The compounds cafestol and kahweol, (here "C" and "K") present in the coffee oils in the fine particulate coffee grounds (both which escape metallic filtration; see above) have been extensively studied by medical researchers and have been conclusively shown to substantially elevate serum, cholesterol, triglycerides, and liver function tests. See, for example, P. Zock, M. B. Katan, M. P. Merkus, et al., *Effect of a Lipid-Rich Fraction from Boiled Coffee on Serum Cholesterol*, Lancet 1990; 335:1235–7; H. Heckers, U. Gobel & U. Kleppel, *End of the Coffee Mystery: Diterpene Alcohols Raise Serum Low-Density Lipoprotein Cholesterol and Triglyceride Levels*, Journal of Internal Medicine, (J. Int. Med.) 1994; 235:192–3; R. Urgert, A. G. M. Schultz & M. B. Katan, *Effects of Cafestol and Kahweol from Coffee Ground Son Serm Lipids and Serum Liver Enzymes in Humans*, American Journal of Clinical Nutrition (AM. J. Clin. Nutr.) 1995; 61:149–54; W. Weusten-Van Der Woy, et al., *Identity of the Cholesterol—Raising Factor From Boiled Coffee and its Effects on Liver Functions Enzymes*, Journal of Lipid Research (J. Lipid. Res.) 1994; 35:721–33; E. Arnesen, N. E. Huseby, T. Brenn & K. Try, *The Tromso Heart Study, Distribution of, and Determinants for, Gamma-Glutamyl Transferase in a free Living Population*, Scandinavian Journal of Clinical Laboratory Investigation, (Scand. J. Clin. Lab. Invest.) 1986; 46:63–70; O. Nelssen, D. H. Forde, & T. Brenn, *The Tromso Study. Distribution and Population Determinates of Gamma-Glutamyl Transferase*, American Journal of Epidemiology (AM. J. Epidemiol.) 1990; 132:318–26; *Ulmann's Encyclopedia of Industrial Chemistry—5th Edition*, 1986; Vol. A7:pg. 334; M. Van Desseldorp, et al., *Cholesterol—Raising Factor from Boiled Coffee does not Pass a Paper Filter*, Arteriosclerosis and Thrombosis 1991; 11:586–93.

About 18% of Arabic coffee (bean) is lipid (oil). Of that 18%, 20% is composed of fatty acid esters of diterpene alcohols known as cafestol and kahweol (herein "C" and "K"). The aforementioned Zock, et al. article showed that the lipid (oil) rich floating on the surface of boiled coffee raised the serum LDL-C cholesterol and serum triglycerides (both atherogenic) by 29% and 55% respectively. The aforementioned Heckers, et al. article found that subjects given 148 mg of C and K daily for one month had a 50% increase in serum LDL-C and an 87% increase in serum triglycerides. One double espresso (approximately 30 cc) can contain up to 24 mg of C and K in a single cup. [Furthermore, the espresso brewing method was shown by Urgert, et aL in the *Journal of Agricultural and Food Chemistry*, August 1995 to be the most effective at extracting the harmful compounds C and K, when compared to other brewing methods, i.e. drip vs. boil vs. percolation, etc.]

The previously cited article by Urgert, et al. confirms the above results, but the studies there described are based on the C and K found in the particulate grounds found at the bottom of the coffee cup. The particulate grounds which escaped filtration were found to be potent carriers of C and K and in addition to raising cholesterol and triglycerides C and K were found to elevate liver enzymes serum ALT (alanine aminotransferase) and serum AST (aspartate aminotransferase) to a lesser extent. These liver enzymes, when elevated, can indicate hepatocellular (liver) dysfunction and/or damage. Other researchers confirmed the adverse effects of C and K on the liver function tests. See, for example, the aforecited Urgert, et al., Weusten-Van Der Wouw, et al., Amesen, et aL and Nilssen, et aL references.

This assemblage of evidence clearly establishes the need for a filter which can rid an espresso coffee beverage of its harmful oils and unfiltered grounds, which is what the present invention can accomplish.

It has been discovered that paper coffee filters can remove substantially the C and K in coffee beverages by filtering both the oils and small particulate grounds which have been found to house C and K. See the aforecited Urgert, et aL paper and the article by Van Desseldorp, et aL. Prior to the present invention, paper filters have not been developed for espresso-type coffee makers since it would appear to be redundant to the metallic filter.

SUMMARY OF THE INVENTION

A principal feature of the present invention is the precision of an improved filtering device for an espresso-type coffee maker.

The espresso-type coffee maker is of the type having a spout to deliver heated water under pressure, and a receptacle to receive the brewed filtered coffee. The filtering device has a metallic filter in the path of heated coffee passing to the receptacle. In accordance with the present invention, filter paper is provided in the flow path of the liquid brewed coffee which removes a substantial part of the coffee oils and particulate grounds which escape metallic filtration. These substances house the cafestol and kahweol previously discussed and thus, these undesirable substances are, at least partly, removed from the brewed coffee liquid.

Thus, one advantage of the invention is that the filtering device of the present invention substantially prevents, in the consumers of its treated coffee, the raising of serum LDL cholesterol, liver enzymes (ALT) and triglycerides, all potentially dangerous perturbations.

Yet, another advantage of the invention is that the removal of the frequently rancid, bitter coffee oils and grounds can improve the flavor of the coffee beverage.

Still another feature of the invention is that the paper filter may have a plurality of layers to increase the removal of oils from the coffee beans and the fine coffee grounds. These layers are preferably crimped together about the perimeter of the filter so as to increase the rigidity of the disposable filter and make it easier to handle and use.

Another advantage of the invention is the ease of use and clean up. The filter fits quickly and easily into the holding pan and on top of the pre-existing metallic filter. After the coffee grounds are spent, a tap on the holding pan held upside-down over a refuse container, sends the charge of coffee grounds with the paper filter (which form a cake) into said refuse container, with no residue left in the pan, which is not infrequently the case when a paper filter is not used.

Further, features and advantages will become more fully apparent in the following description of the embodiments of the invention, and form appended claims.

The invention, together with further advantages and features thereof, may best be understood by reference to the following description taken in connection with the accompanying drawings, in the several figures of which like reference numerals identify like elements.

DESCRIPTION OF THE PREFERRED EMBODIMENTS

Figure 1:
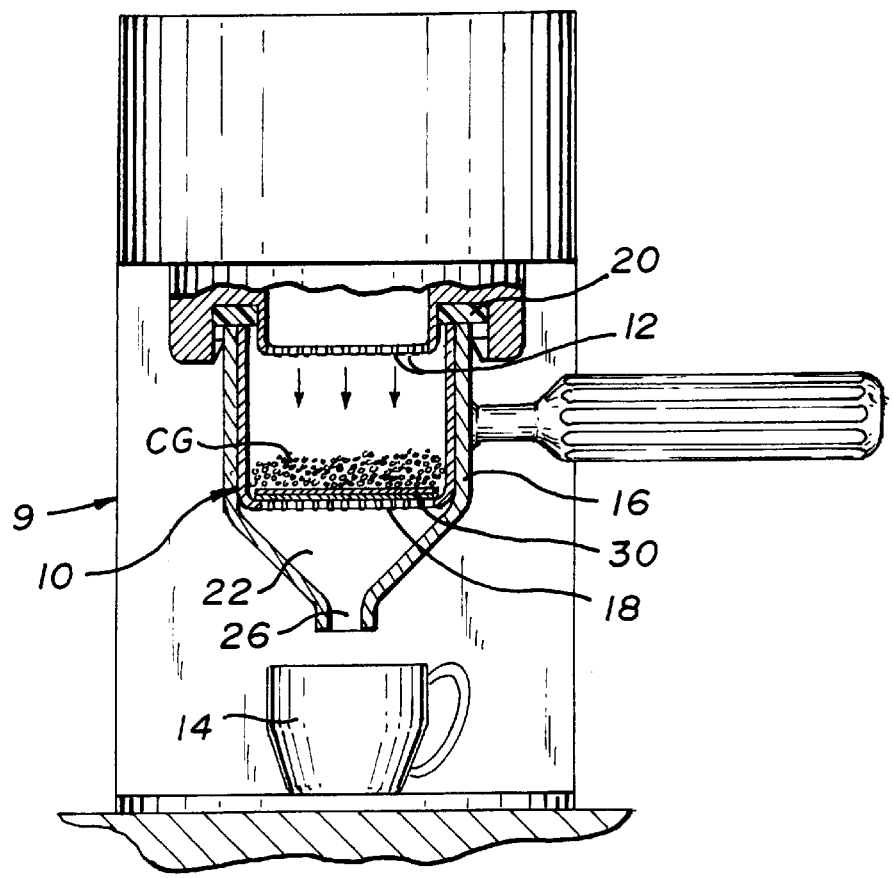
FIG. 1 is an elevational view, partly in section, of an espresso-type coffee maker incorporating the principals of the present invention.
Figure 2:
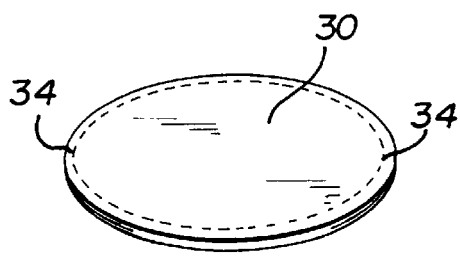
FIG. 2 is a perspective view of one part of the apparatus of FIG. 1, namely a disposable filter made in accordance with the principals of the present invention.

Referring now to FIG. 1, there is shown an espresso-type coffee maker with a filtering device generally designated 10. The coffee maker 9 is of the type which delivers hot water under pressure to spouts 12, after which the heated water passes through ground coffee beans CG in the filtering device to a receptacle 14, such as a cup, which receives the heated coffee.

The filtering device 10 has a holding pan 16, which receives a perforated metallic filter 18 of known type in espresso-type makers. The holding pan 16 may have a rubber O-ring 20 to sealingly engage against an outer surface of the metallic filter 18 and ensure that the hot water is pumped through the coffee CG and filters under pressure.

Figure 3:
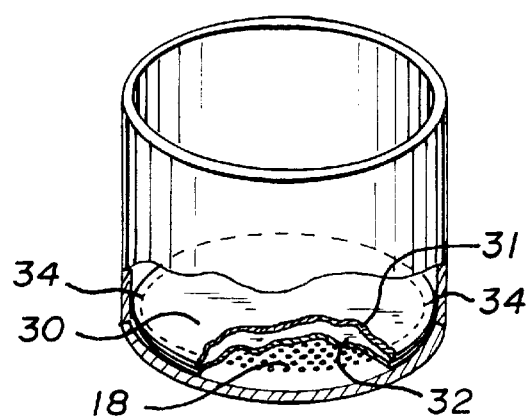
FIG. 3 is a perspective view with parts broken away to show internal parts, of part of the espresso-type coffee maker of FIG. 1, illustrating the positioning of the filter of FIG. 2 therein.

The holding pan 16, has a conic chamber 22 beneath the metallic filter 18 which communicates with a passageway 26, then to a receptacle 14. In accordance with the present invention, a paper filter 30 is removably placed on top of the metallic filter 18 "sandwiched" between the coffee grounds CG and the metallic filter 18. The paper filters may be of the type sold under the trademark MR. COFFEE for conventional (non-pressurized) type coffee makers, and the filters may be cut to size to fit the base of the metallic filter 18. In a preferred form, the filter 30 may be made of a plurality of layers of the paper layers such as the two layers 31, 32 shown in FIG. 3, each of which layer is of the conventional thickness for non-espresso coffee filters. These layers are crimped together about their perimeter as indicated at the number 34. This forms an easily handled, disposable, multilayer filtering unit. Thus, the coffee grounds CG are filtered by the metallic filter 18, and the brewed coffee is also filtered by the paper filter 30 to remove harmful lipids and coffee grounds which may effect a rise in the cholesterol levels in a user of the brewed coffee. The modified paper filter 30 of the type sold under the trademark are preferably placed directly on the metallic filter 18, and the ground coffee beans CG are placed directly onto the paper filter.

A prototype of the filtering device of the present invention was constructed, tested, and shown to be effective. The prototype was sized and shaped to fit the espresso holding pan of a Rancilio brand machine, Model No. MISS 935624, made by Rancilio of Italy. Thus it was approximately circular in shape with a diameter of approximately 5 cm (which, of course, can be custom made to fit any size holding pan) and comprised of two layers of standard filter paper derived from filters of the cone variety. It was, as a consequence, twice the standard thickness of conventional coffee filters.

Some tests were made on the filtering device 10 as follows. First, in order to determine the amount of oil in the coffee brewed without use of the paper filter, some coffee was brewed and allowed to chill in a refrigerator for 2–3 hours in order to allow the oils to get on the surface of the liquid air interface. Copious quantities of lipids were found on the unfiltered coffee. On the other hand, approximately 80% less lipids were found on the coffee which was filtered by one layer of the paper filter 30, while approximately 95% of the lipids were removed from the coffee when two layers of the paper filter 30 were used. Negligible quantities of fine particulate coffee grounds were noted at the bottom of the cup when either one or two layers of filter paper were used compared to none. These observations are in agreement with other studies performed, such as those referred to above in the articles of Urgert, et aL and Van Desseldorp, et al.

It should now be clear that an espresso coffee machine has been described which is easy to use and to clean. The filter fits quickly and easily into the holding pan on top of the pre-existing metallic filter. After the coffee grounds are spent, a tap on the holding pan held upside-down over a refuse container sends the charge of coffee grounds with the paper filter (which form a cake) into said refuse container, with no residue left in the pan.

The foregoing detailed description is for clearness of understanding only, and no unnecessary limitations should be understood therefrom, as the invention modifications will be obvious to those skilled in the art.

While particular embodiments of the invention have been shown and described, it will be obvious to those in the art that changes and modifications may be made without departing from the invention and, therefore, the aim in the appended claims is to cover all such changes and modifications as fall within the true spirit and scope of the invention.

I claim:

1. A filtering device for an espresso-type coffee maker of the type having a spout to deliver heated water under high pressure to finely ground coffee beans to brew coffee therefrom, and a receptacle to receive brewed filtered coffee, means defining a flow path between said finely ground beans to said receptacle, comprising:

a metallic filter in said path of heated coffee passing to the receptacle which filter has openings sized to filter out the fine espresso coffee grounds; and at least one layer of filter paper in the path of the heated coffee passing to the receptacle.

2. The device of claim 1 wherein the filter paper has a plurality of layers.

3. The device of claim 2 where the filter paper layers are crimped together to form an easily handled unit.

4. In an espresso-type coffee maker of the type that delivers heated water under 3 to 15 bar of pressure to a pan in which finely ground coffee beans are present and from which brewed coffee is removed through a permanent filter, the improvement of a disposable paper filter across the flow path of the brewed coffee, said paper filter being of a thickness and size so as to effectively remove and trap lipids and fine grounds from the brewed coffee and to reduce the lipids in the brewed coffee by at least 50% and wherein said paper filter is sized and shaped to fit over and adjacent the top of said permanent filter between said permanent filter and said finely ground coffee and said finely ground coffee is positioned above and on said paper filter so that the paper filter also serves to aid in removing, in a single operation, the used grounds as well as the paper filter from the coffee maker.

5. The invention of claim 4 wherein the paper filter is of such a thickness and size so as to effectively remove and trap lipids and fine particulate grounds from the brewed coffee so as to remove approximately 95% of the lipids that would be present absent the paper filter.

6. The invention of claim 4 wherein said filter paper is made up of at least two layers of standard thickness coffee filter paper.

7. The method of making lower lipids containing brewed coffee liquid in an espresso-type coffee maker of the type that makes coffee liquid by passing heated water under pressure of 3 to 15 bars through finely ground coffee beans held above a permanent filter comprising the steps of placing disposable paper coffee filter material, of the type that may absorb lipids, and of a size and shape to cover the permanent filter in the maker atop and covering the permanent filter, placing the finely ground coffee beans atop said paper coffee filter material and passing heated water at a pressure of 3 to 15 bars through, sequentially, the coffee beans, and through said paper filter material, and said permanent filter to create brewed coffee liquid and to allow lipids therefrom to be absorbed by said paper filter material so as to make lower lipid containing coffee liquid.

* * * * *